United States Patent Office 3,036,633
Patented May 29, 1962

3,036,633
OIL AND GAS WELL CEMENTING COMPOSITION
Eldon J. Mayhew, Moab, Utah, assignor, by mesne assignments, to Halliburton Company, a corporation of Delaware
No Drawing. Filed July 7, 1958, Ser. No. 746,585
6 Claims. (Cl. 166—31)

This invention relates to cement compositions and is concerned with providing such a composition useful for various cementing purposes during and following the drilling of oil and gas wells.

The art of oil and gas well cementing is a highly developed one. Cement-water slurries, with or without various additives, have been used for many years in cementing procedures carried out from time to time during the drilling of and the productive life of a well. Cementing is often applied during drilling and completion procedures in connection with protection of production zones, isolation and confinement of water zones, support of bore hole wall, anchorage of casing, and control of lost circulation not overcome by methods associated with the circulation of drilling mud. Such cementing procedures are ordinarily regarded as being of primary character. Other cementing procedures are of a secondary nature, in that they involve additions to or repairs of the primary cementing.

These general purposes of cementing in oil and gas well practice and various methods for inserting and applying the cement in slurry form are well known to those skilled in the art.

The cement employed in a cement-water slurry is of inorganic type, such as ordinary Portland cement and variations thereof. The additives that are often included in the slurry to obtain results not possible with the cement-water mix alone, may take the form of extenders, accelerators, retarders, reinforcing agents, and materials which increase or decrease the weight of the slurry.

This invention is concerned with such a cement-water slurry whose characteristics are altered beneficially by the addition of an agent not heretofore employed as an additive, even though used extensively as a lost circulation material with both oil base (Larsen Patent No. 2,597,085 and Miller No. 2,773,670) and aqueous (Mayhew Patent No. 2,812,161) drilling fluids and suggested as an ingredient of an earth-consolidating, thermosetting, resin-forming, liquid mixture which cements fluid-permeable, loose earth particles together at the temperatures encountered in deep well formations, without blocking the interstices to fluid flow (Cardwell et al. Patent No. 2,573,690).

A principal objective of the present invention is to provide an oil and gas well cementing composition of exceptionally light weight, but without increase in abrasiveness, such as occurs when perlite or pumice is employed as an aggregate. In this connection, it should be noted that a lightweight cement-water slurry is easier to place and to hold in place until set.

Other objectives are to provide such an oil and gas well cementing composition having little decrease in strength over a cement-water slurry alone, but having a decrease in permeability porosity, density, and shrinkage, one whose cost will not be excessive, which can be compounded from readily accessible materials, and which will be durable in fulfilling the various purposes for which such a composition is applied in practice.

An outstanding feature of the invention is the incorporation of gilsonite in discrete particle form in a cement-water slurry, ordinarily in at least equal proportion by volume with the cement.

Gilsonite is a naturally occurring asphaltite, having specific gravity substantially equivalent to that of water. While it is of very light weight in comparison to most solids, it is not porous. Unlike perlite, which is presently employed as an aggregate for the lightening of oil and gas well cement, it does not absorb water, nor is it even wet by water. Thus, I have found that water requirements for making an acceptable cement slurry, which may be easily placed as required and which will set firmly and permanently, are considerably less than those of perlite as an addition agent. I have found, moreover, that the strength of the set cement is greater than with perlite.

In the present composition, the gilsonite serves as an aggregate which lightens the cement-water slurry, imparts valuable lubricating properties that reduce abrasiveness of the slurry, replaces a large portion of the cement ingredient and reduces shrinkage of the setting cement composition to an unusual extent, reduces compressibility of the set cement composition when in place, and insulates against undesirable loss or gain of heat by the well.

Additional objects and features of the invention will become apparent from the following detailed description of preferred formulations thereof.

In the formulation of the cementing composition of the invention, it is preferable to employ gilsonite in an amount ranging from approximately one-half to approximately ten times by volume the amount of the cement utilized, depending upon the particular result desired.

The lower range is employed where maximum strength is important; the higher range where the various qualities imparted by the gilsonite are most important.

Particle size and particle size distribution of the gilsonite determine the strength and porosity-permeability characteristics of the set cement for any given mix ratio. Where maximum strength is desirable, a coarse gilsonite aggregate should be used, for example, the following:

| Screen No. | Percent retained by weight | |
| --- | --- | --- |
| | Min. | Max. |
| ¼ inch | 0 | 0 |
| 4 | 0 | 5 |
| 16 | 20 | 55 |
| 50 | 70 | 95 |
| 100 | 98 | 100 |

Where lightest weight and lowest porosity-permeability are important and strength is to be sacrificed or is of little importance, an aggregate of minus 50 mesh or finer may be used.

Conditions are often encountered in the field requiring various combinations of particle size and particle size distribution. The above examples represent extremes. The mix must, however, always be pumpable through the system from the mixing point to the final point of placement of the cement slurry. The coarser the aggregate, the less that may be present in any given slurry without impeding pumpability. For example, a cement-gilsonite ration of 1:4, using the coarse aggregate specified above, is difficult to pump and is likely to plug restricted passages in the system, whereas the same mix, using the fine aggregate specified above, will never plug if the water-cement ratio is high enough. The finer aggregate also forms, with the cement particles and with bentonite particles if present as an additive, a thin filter cake having a low water loss.

Slurry having weight as low as 8.5 pounds per gallon is obtainable using the higher amounts of gilsonite indicated by the aforesaid range. It will be realized, of course, that slurry weight will vary in accordance with the amount of water and additives used.

As mentioned hereinbefore, slurry weight is of extreme importance for many well cementing problems. When a water zone is encountered and it is desirable to prevent entry of water into the bore hole, an exceptionally lightweight slurry conforming to the invention will remain in place until set, because its density is more nearly that of water.

Ordinary cement-water slurry has very low viscosity and is very heavy, usually weighing from 15 to 17 pounds per gallon. Drilling mud normally weighs from 9 to 11 pounds per gallon. The closer the weight of the cement slurry is to that of the drilling mud, the less difficult in placing the cement.

A bentonite-cement slurry can be made as low as 13 pounds per gallon. By adding perlite as an aggregate, the weight can be brought down to somewhat under 12 pounds per gallon. However, when perlite is used, disadvantages such as abrasiveness, porosity-permeability, and compressibility are introduced.

The addition to the mix of bentonite to the extent of from 1% to 8% of the cement present increases water requirements for the mix in making a slurry and reduces strength, but it also prevents segregation of the mixed cement and gilsonite particles and helps to maintain a homogeneous mix.

Calcium chloride may be used as an additive to speed the setting, where other additives or low temperature conditions unduly retard the set or in instances where it is desirable to prevent cement movement as clearly as possible after placement and prevent loss into thief zones.

Puzzolanes may be added to increase strength or as extenders. Other ordinarily used additives may be employed as ingredients for specific purposes, for example, as retarders to extend the setting time of the slurry and allow additional time for mixing and pumping on lengthy jobs, or where extremely high pressures and/or temperatures are encountered, or where contaminants or additives that may unduly accelerate the set are present.

An amount of a petroleum solvent which depends upon the amount of gilsonite present, may be added to the wet or dry mix for wetting the surface of the gilsonite particles and causing them to form an intimate bond with casing and earth formations of the bore hole, thus preventing corrosion and minimizing pulling away of the cement from the casing and/or bore hole wall by reason of the shrinkage normal to setting of the cement.

Instead of adding the solvent directly to the mix, it may be pumped through the casing and into the cementing zone in advance of the gilsonite-cement slurry.

The addition of substantial quantities of gilsonite to a cement-water slurry greatly reduces the thermal conductivity of the cement, thereby accelerating the setting thereof and insulating the pipe from the bore hole wall and from the producing zone. Such insulation of the pipe is particularly advantageous where low pour point oils are being produced, in which instances, it is desirable to keep the temperature of the oil near that temperature at which it issues from the producing zone.

The "K" factor (B.t.u.'s. transmitted/hr./sq. ft./inch thickness/° F. temperature difference) of a normal neat cement is approximately 8, while that of an 8:1 gilsonite cement is approximately 2.

It is common practice in the art to utilize a petroleum distillate as the slurry-forming liquid, instead of water. Upon placement of such a slurry in a water-bearing zone, the water displaces the distillate and effects setting of the cement in normal manner. This practice may also be employed with a gilsonite cement mix conforming to the invention, provided that the time prior to displacement of the distillate by the water is not so long as to seriously affect the gilsonite by the dissolving action of the distillate.

In this connection, it should be realized that there are gilsonites of various classes with respect to melting points and solubilities. The lower the melt point, the faster the gilsonite will dissolve in a solvent therefor or soften under conditions of heat. Therefore, the use of gilsonite in an oil and gas well cementing composition affords an opportunity to select a class of that material which best serves the particular purpose.

The heat softening characteristic of gilsonite becomes of particular importance in instances of relatively high bottom hole temperatures, where there is a tendency for the gilsonite to soften and diffuse into the surrounding cement, thereby rendering it waterproof.

Whereas this invention is here described with respect to preferred specific forms thereof, it should be understood that various modifications may be made without departing from the essential inventive concepts as defined by the claims which here follow.

I claim:

1. A method of cementing a casing in an oil or gas well comprising introducing into the annulus between the casing and the bore hole wall of said well a pumpable cement slurry capable of setting up and containing a hydraulic calcareous cement, water and gilsonite in discrete particle form as an aggregate in amount between about 0.5 to 10 times by volume the amount of the cement present in the slurry, said gilsonite constituting the only aggregate present in the slurry; and then permitting the slurry to set up within the well.

2. A method of cementing a casing in an oil or gas well, comprising introducing into the annulus between the casing and the bore hole wall of said well a pumpable cement slurry capable of setting up and containing a hydraulic calcareous cement, water, petroleum distillate and gilsonite in discrete particle form as an aggregate in amount between about 0.5 to 10 times by volume the amount of the cement present in the slurry, said gilsonite constituting the only aggregate present in the slurry and the quantity of distillate being only sufficient to wet the surfaces of the particles of gilsonite; and then permitting the slurry to set up within the well.

3. A method of insulating an oil or gas well against thermal conductivity which comprises introducing into the annulus between the bore hole wall and the well casing a pumpable cement slurry capable of setting up and containing a hydraulic calcareous cement, water and gilsonite in discrete particle form as an insulating aggregate in an amount from approximately eight to ten times by volume the amount of cement present in the slurry; and then permitting the slurry as so placed to set up.

4. A method of insulating an oil or gas well against thermal conductivity which comprises introducing into the annulus between the bore hole wall and the well casing a pumpable cement slurry capable of setting up and containing a hydraulic calcareous cement, water, petroleum distillate and gilsonite in discrete particle form as an insulating aggregate in an amount from approximately eight to ten times by volume the amount of cement present in the slurry and the quantity of distillate being only sufficient to wet the surfaces of the particles of gilsonite; and then permitting the slurry as so placed to set up.

5. A method of cementing a casing in an oil or gas well bore hole which comprises pumping a petroleum distillate into the cementing zone between the casing and the bore hole wall, then pumping into said cementing zone a light weight pumpable cement slurry capable of setting up and consisting essentially of a hydraulic calcareous cement, water and gilsonite in discrete particle form as an aggregate in amount between about 0.5 to 10 times by volume the amount of cement present in the slurry; and then permitting the slurry to set up within the cementing zone.

6. A method of cementing a conduit in a subterranean drilled well which comprises forming a pumpable cement slurry capable of setting up and composed of a hydraulic calcareous cement, water and gilsonite, the gilsonite being in the form of discrete particles 100% of which will pass a standard ¼ inch sieve and at least about 98% of which will be retained on a standard 100 mesh sieve, the gilsonite being present in amount between about 0.5 to 10 times by volume the amount of the cement present in the slurry; introducing said slurry into the annulus between the conduit and the bore hole wall; and then permitting the slurry to set up around the conduit.

References Cited in the file of this patent

UNITED STATES PATENTS

| | | |
|---|---|---|
| 777,794 | Livingston | Dec. 20, 1904 |
| 1,744,869 | Cross | Jan. 28, 1930 |
| 2,285,302 | Patterson | June 2, 1942 |
| 2,573,690 | Cardwell 166-33 | Nov. 6, 1951 |
| 2,609,882 | Morgan | Sept. 9, 1952 |
| 2,695,669 | Sidwell | Nov. 30, 1954 |
| 2,776,713 | Morgan | Jan. 8, 1957 |
| 2,812,161 | Mayhew 106-9.6 | Nov. 5, 1957 |
| 2,823,753 | Henderson et al. | Feb. 18, 1958 |